US008137774B2

(12) United States Patent
Kendig et al.

(10) Patent No.: US 8,137,774 B2
(45) Date of Patent: Mar. 20, 2012

(54) COMPOSITIONS OF ETHYLENE/VINYL ACETATE COPOLYMERS FOR HEAT-SEALABLE EASY OPENING PACKAGING

(75) Inventors: Terrance D. Kendig, Newark, DE (US); Stephen Robert Tanny, Newark, DE (US)

(73) Assignee: E.I. Du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/955,956

(22) Filed: Nov. 30, 2010

(65) Prior Publication Data

US 2011/0068040 A1 Mar. 24, 2011

Related U.S. Application Data

(62) Division of application No. 11/045,824, filed on Jan. 27, 2005, now Pat. No. 7,892,391.

(60) Provisional application No. 60/540,216, filed on Jan. 29, 2004.

(51) Int. Cl.
B32B 7/06 (2006.01)
B32B 7/00 (2006.01)
B32B 27/00 (2006.01)

(52) U.S. Cl. ...... 428/35.2; 428/35.7; 428/422; 428/520; 428/35.3; 428/35.4; 206/204; 206/524.1; 156/322; 156/308.2; 156/308.4

(58) Field of Classification Search .................. 428/354, 428/349, 35.2, 35.7, 422, 520; 524/272; 156/308.4, 308.2, 322; 206/204, 524.1
See application file for complete search history.

(56) References Cited

U.S. PATENT DOCUMENTS

| 2,241,322 | A | | 5/1941 | Hanford |
| 2,312,966 | A | | 3/1943 | Hanford |
| 2,512,606 | A | | 6/1950 | Bolton et al. |
| 3,278,663 | A | | 10/1966 | Graham |
| 3,337,665 | A | | 8/1967 | Underwood et al. |
| 3,344,014 | A | | 9/1967 | Rees |
| 3,393,210 | A | | 7/1968 | Speck |
| 3,456,044 | A | | 7/1969 | Pahlke |
| 3,484,405 | A | | 12/1969 | Seto |
| 3,600,347 | A | * | 8/1971 | Godar et al. ............ 524/471 |
| 3,626,026 | A | * | 12/1971 | Fukumura et al. ........ 525/166 |
| 3,645,992 | A | | 2/1972 | Elston |
| 3,734,798 | A | | 5/1973 | Dooley |
| 3,896,069 | A | | 7/1975 | Kosaka et al. |
| 4,076,698 | A | | 2/1978 | Anderson et al. |
| 4,167,433 | A | * | 9/1979 | Lakshmanan ............ 156/322 |
| 4,174,358 | A | | 11/1979 | Epstein |
| 4,508,000 | A | | 4/1985 | Suzuki |
| 4,537,922 | A | | 8/1985 | Chang et al. |
| 4,590,106 | A | | 5/1986 | Hsu et al. |
| 4,631,308 | A | | 12/1986 | Graham et al. |
| 4,760,116 | A | | 7/1988 | Roberts |
| 4,769,421 | A | | 9/1988 | Hwo |
| 4,797,235 | A | | 1/1989 | Garland et al. |
| 4,886,634 | A | | 12/1989 | Strutzel et al. |
| 5,126,176 | A | | 6/1992 | Blaskovitz et al. |
| 5,198,401 | A | | 3/1993 | Turner et al. |
| 5,405,922 | A | | 4/1995 | DeChellis et al. |
| 5,767,184 | A | | 6/1998 | May |
| 5,823,327 | A | | 10/1998 | Wu et al. |
| 5,837,383 | A | | 11/1998 | Wenzel et al. |
| 6,010,784 | A | | 1/2000 | Peterson |
| 6,112,888 | A | | 9/2000 | Sauro et al. |
| 6,358,622 | B1 | | 3/2002 | Shida et al. |
| 6,630,237 | B2 | | 10/2003 | Rivett et al. |
| 2003/0020314 | A1 | | 1/2003 | Mauro et al. |
| 2003/0091847 | A1 | * | 5/2003 | Hawes et al. ............ 428/500 |
| 2003/0203141 | A1 | | 10/2003 | Blum et al. |
| 2005/0020777 | A1 | | 1/2005 | Breese et al. |
| 2005/0159549 | A1 | | 7/2005 | Kendig et al. |

FOREIGN PATENT DOCUMENTS

| JP | 58145775 | 8/1983 |
| JP | 06328632 | 11/1994 |
| WO | 94/24205 A1 | 10/1994 |

OTHER PUBLICATIONS

Dragan Djordevic, "Coextrusion", RAPRA Review Reports, pp. 65-66, 1992.
Dragan Djordevic, "Coextrusion", TAPPI, pp. 39, 45, 47-49, 1989.
Extrusion Coating Manual, TAPPI, 4th Edition, Thomas Bezigian ed., p. 31, 1999.
Joseph Dooley< "Viscoelastic Flow Effects in Multilayer Polymer Extrusion", pp. 119-122, 2022.
TP Licocene® PP MA 6452 Trade Literature, Clarient International Ltd.
International Search Report, May 18, 2005, International Application No. PCT/US2005/003337.
ACLAR-Rx20e Data Sheet.
ASTM F 904.
ASTM F 88.
ASTM D 3236.
ASTM D 1238.

* cited by examiner

*Primary Examiner* — Rena Dye
*Assistant Examiner* — Yan Lan

(57) ABSTRACT

Disclosed are compositions comprising ethylene/vinyl acetate copolymers, tackifying resins and optionally polyolefins (for example, polyethylene and polypropylene) that provide strong, tight hermetic heat seals with an easily peelable opening feature to fluoropolymers such as polychlorotrifluoroethylene. Also disclosed are multilayer structures and packages comprising these compositions.

16 Claims, No Drawings

COMPOSITIONS OF ETHYLENE/VINYL ACETATE COPOLYMERS FOR HEAT-SEALABLE EASY OPENING PACKAGING

CROSS REFERENCE TO RELATED APPLICATIONS

This application is a division of co-pending U.S. patent application Ser. No. 11/045,824, filed Jan. 27, 2005 which claims the benefit of U.S. Provisional Patent Application No. 60/540,216, filed Jan. 29, 2004.

BACKGROUND OF THE INVENTION

1. Field of the Invention

This invention relates to compositions comprising ethylene/vinyl acetate copolymers, tackifying resins and optionally polyolefins (for example, polyethylene and polypropylene) that provide strong, tight hermetic heat seals with an easily peelable opening feature to fluoropolymers such as polychlorotrifluoroethylene. These compositions will be useful in extrusion coating, cast and blown film processes as well as lamination to other substrates.

This invention also relates to multilayer structures and packages comprising these compositions.

2. Description of the Related Art

The packaging industry uses a wide variety of films and containers prepared from various thermoplastic resins and compositions for packaging food and non-food products. These packages must provide adequate protection (for example, protection from mechanical damage, barriers to air or moisture, etc.) of the product contained within until the consumer is ready to use the product. It is also desirable for the package to be designed to allow the consumer easy access to the product at the appropriate time.

Materials used in packaging include polychlorotrifluoroethylene (PCTFE) fluoropolymers. A particular advantage of PCTFE is its high moisture and oxygen barrier properties, allowing greater shelf life of the product packaged. A number of homopolymers and copolymers derived from polymerization of chlorotrifluoroethylene are available commercially under the tradename Aclar® from Honeywell, Inc., Morristown, N.J. It is generally difficult to find compositions that provide good adhesion to fluoropolymers such as PCTFE because of their inherent properties.

Typically a PCTFE layer is adhered directly to a second layer of polyvinyl chloride (PVC) or polyethylene terephthalate (PET) to create a structure that can be formed into packages. PVC or PET is typically used as the sealing surface as PVC and PET have high affinity to many heat sealable materials. PVC or PET also provides bulk to the structure, as they are far less expensive than the PCTFE. Both materials provide high clarity and formability. However, PVC and PET have insufficient oxygen and moisture barrier properties when used as the seal surface. When the barrier top sealant web is heat sealed to the PVC or PET, the barrier properties of the PCTFE cannot be fully realized. Oxygen and moisture permeate through the PVC or PET between the heat-sealable lidding material and the PCTFE, leading to shortened shelf life.

Existing sealant systems that bond to PCTFE include solvent-borne systems based on, among others, styrene butadiene or amorphous polyester. The sealants are applied by roller or gravure systems to carrier webs (e.g. 1 mil-thick foil) and require drying at elevated temperature to remove the solvents and maintain low amounts of residual solvents. The heat-seal coatings produced in this manner are generally very thin and are limited to ingredients that are soluble in solvent systems.

SUMMARY OF THE INVENTION

An object of this invention is to provide a heat sealable material to provide peelable, hermetic seals at a wide range of seal strengths to polychlorotrifluoroethylene (PCTFE) fluoropolymers.

Accordingly, this invention provides for the use of compositions comprising (a) from about 10 to about 90 weight % of at least one ethylene/vinyl acetate copolymer;

(b) from about 5 to about 35 weight % of at least one tackifying resin;

(c) from 0 to about 45 weight % of at least one polyolefin; and (d) from 0 to about 30 weight % of filler for heat sealing to polychlorotrifluoroethylene fluoropolymers.

This invention also provides for the use of a multilayer structure comprising at least one layer of the ethylene/vinyl acrylate-tackifier composition described above and at least one additional layer comprising a material selected from the group consisting of foil, paper, polyesters, polyamides, polyolefins, polyethylene vinyl alcohol, polyethylene vinyl acetate, ethylene/(meth)acrylic acid copolymers and ionomers thereof, polyvinyl chloride, polyvinylidene chloride and anhydride-modified polyolefins for heat sealing to polychlorotrifluoroethylene fluoropolymers.

This invention also provides for a package comprising the composition described above and a polychlorotrifluoroethylene fluoropolymer.

DETAILED DESCRIPTION OF THE INVENTION

As used herein the term "consisting essentially of" means that the named ingredients are essential; however, other ingredients that do not prevent the advantages of the present invention from being realized can also be included.

All references disclosed herein are incorporated by reference.

"Copolymer" means polymers containing two or more different monomers. The terms "dipolymer" and "terpolymer" mean polymers containing only two and three different monomers respectively. The phrase "copolymer of various monomers" means a copolymer whose units are derived from the various monomers.

Thermoplastic compositions are polymeric materials that can flow when heated under pressure. Melt index (MI) is the mass rate of flow of a polymer through a specified capillary under controlled conditions of temperature and pressure. Melt indices reported herein are determined according to ASTM 1238 at 190° C. using a 2,160 g weight, with values of MI reported in grams/10 minutes. The thermoplastic compositions described herein are suitable for preparation of films and multilayer structures by extrusion processing.

The term "foil" as used herein refers to a thin, flexible film or sheet of metal, particularly aluminum. It also refers to multilayer structures in which at least one layer of aluminum is adhered to additional layers of other materials, provided at least one exterior layer of the multilayer structure is a layer of aluminum.

Peelable heat seals commonly can be designed to have three different failure modes when peeling seal to seal or seal to differentiated substrate. Failure can be interfacial, delamination or cohesive when peeling one from the other under stress at various angles of peel and speeds. Interfacial seals are designed to fail at the heat seal interface of the selected sealing surface (i.e. the sealant layer peels cleanly away from the substrate layer). In most cases seal strength is determined by temperature, pressure and dwell time. Seals that do not peel cleanly can contaminate the contents of the package with fragments of the seal or lidding. Interfacial peelable seals are desirable to prevent such contamination. Delamination heat seals are designed to fail at an internal interface of a multi-layer film structure. This designed failure interface is in a chosen layer somewhere behind the actual heat seal layer in the film structure. Thickness and adhesion to the chosen internal layer interface will determine strength of the seal during peeling. In this case the entire sealant layer transfers to the substrate while the film structure is being peeled away from. Cohesive seal failure by design fails within the actual sealant layer itself. When peeling the seal under stress and speed, the seal layer itself splits within and transfers a portion of the sealant material to the sealant substrate. Internal strength of the sealant material is the determining factor for actual strength of the heat seal.

The compositions of this invention allow for either interfacial peelable seals or cohesive seal failure. Compositions without filler provide interfacial peelable seals. Addition of filler allows for cohesive seal failure.

As noted above, this invention provides for the use of compositions comprising at least one ethylene/vinyl acetate copolymer; at least one tackifying resin; optionally at least one polyolefin; and optionally filler for heat sealing to polychlorotrifluoroethylene fluoropolymers.

Preferred is the use of a composition comprising (a) from about 30 to about 60 weight % of at least one ethylene/vinyl acetate copolymer;

(b) from about 5 to about 25 weight % of at least one tackifying resin;

(c) from about 5 to about 45 weight % of at least one polyolefin.

More preferred is the use of a composition comprising (a) from about 35 to about 60 weight % of at least one ethylene/vinyl acetate copolymer;

(b) from about 5 to about 25 weight % of at least one tackifying resin;

(c) from about 25 to about 45 weight % of at least one polyolefin.

The individual components will be described in more detail below.

Ethylene/Vinyl Acetate Copolymers

Component (a) of the resin composition of this invention comprises at least one ethylene/vinyl acetate copolymer. The ethylene/vinyl acetate copolymer is not limited, but preferably has a vinyl acetate unit content of 2 to 40% by weight, especially 6 to 30% by weight. The ethylene/vinyl acetate polymer may optionally be modified by methods well known in the art, including modification with an unsaturated carboxylic acid or its derivatives, such as maleic anhydride or maleic acid. The ethylene/vinyl acetate copolymer preferably has a melt flow rate, measured in accordance with ASTM D-1238 of 0.1 to 40 g/10 min, especially 0.3 to 30 g/10 min.

A mixture of two or more different ethylene/vinyl acetate copolymers can be used as component (a) in the blended compositions of the present invention in place of a single copolymer as long as the average values for the comonomer content will be within the range indicated above. Particularly useful properties may be obtained when two or more properly selected ethylene/vinyl acetate copolymers are used in blends of the present invention.

Of note is a composition comprising a mixture of three ethylene/vinyl acetate copolymers for component (a) and a tackifier for heat sealing to polychlorotrifluoroethylene fluoropolymers. Also of note is a composition comprising a mixture of two ethylene/vinyl acetate copolymers for component (a), a tackifier and a polyolefin for heat sealing to polychlorotrifluoroethylene fluoropolymers.

Tackifyinq Resins

Tackifiers are used primarily to enhance adhesion to differentiated substrates.

The tackifier may be any suitable tackifier known generally in the art such as those listed in U.S. Pat. No. 3,484,405. Such tackifiers include a variety of natural and synthetic resins and rosin materials. The resins that can be employed are liquid, semi-solid to solid, complex amorphous materials generally in the form of mixtures of organic compounds having no definite melting point and no tendency to crystallize. Such resins are insoluble in water and can be of vegetable or animal origin, or can be synthetic resins. The resins can provide substantial and improved tackiness to the composition. Suitable tackifiers include, but are not necessarily limited to the resins discussed below.

A class of resin components that can be employed as the tackifier composition is the coumarone-indene resins, such as the para-coumarone-indene resins. Generally the coumarone-indene resins that can be employed have a molecular weight that ranges from about 500 to about 5,000. Examples of resins of this type that are available commercially include those materials marketed as "Picco"-25 and "Picco"-100.

Another class of resins that can be employed as tackifiers useful in this invention is the terpene resins, including also styrenated terpenes. These terpene resins can have a molecular weight range from about 600 to 6,000. Typical commercially available resins of this type are marketed as "Piccolyte" S-100, as "Staybelite Ester" #10, which is a glycerol ester of hydrogenated rosin, and as "Wingtack" 95, which is a polyterpene resin.

A third class of resins that can be employed as the tackifier are the butadiene-styrene resins having a molecular weight ranging from about 500 to about 5,000. A typical commercial product of this type is marketed as "Buton" 100, a liquid butadiene-styrene copolymer resin having a molecular weight of about 2,500. A fourth class of resins that can be employed as the tackifier in this invention are the polybutadiene resins having a molecular weight ranging from about 500 to about 5,000. A commercially available product of this type is that marketed as "Buton" 150, a liquid polybutadiene resin having a molecular weight of about 2,000 to about 2,500.

A fifth class of resins that can be employed as the tackifier are the so-called hydrocarbon resins produced by catalytic polymerization of selected fractions obtained in the refining of petroleum, and having a molecular weight range of about 500 to about 5,000. Examples of such resin are those marketed as "Piccopale"-100, and as "Amoco" and "Velsicol" resins. Similarly, polybutenes obtained from the polymerization of isobutylene may be included as a tackifier.

The tackifier may also include rosin materials, low molecular weight styrene hard resins such as the material marketed as "Piccolastic" A-75, disproportionate pentaerythritol esters, and copolymers of aromatic and aliphatic monomer systems of the type marketed as "Velsicol" WX-1232. The rosin that may be employed in the present invention may be gum, wood or tall oil rosin but preferably is tall oil rosin. Also the rosin material may be modified rosin such as dimerized rosin, hydrogenated rosin, disproportionate rosin, or esters of rosin. Esters can be prepared by esterifying the rosin with polyhydric alcohols containing from 2 to 6 alcohol groups.

Preferred compositions of this invention are those wherein the tackifying resin of component (b) is selected from the group consisting of coumarone-indene resins, terpene resins, butadiene-styrene resins, hydrocarbon resins, and rosin materials.

A terpene resin-based tackifier of note is derived from poly-limonene, a monomer recovered from the citrus industry, available as Piccolyte® C115 from Loos & Dilworth, Inc.

Another tackifier resin of note is Regalite R1125 available from Eastman.

A more comprehensive listing of tackifiers, which can be employed in this invention, is provided in the TAPPI CA Report #55, February 1975, pages 13-20, inclusive, a publication of the Technical Association of the Pulp and Paper Industry, Atlanta, Ga., which lists well over 200 tackifier resins that are commercially available.

Polyolefins

Polyolefins suitable for use in the present invention are selected from polyolefins wherein the olefin monomers have from two to twenty carbon atoms. The optional polyolefin of component (c) is not limited and can, for example, be a homopolymer or copolymer of propylene, ethylene, butene, hexene or octene, preferably a homopolymer.

Preferred are polyolefins selected from the group consisting of polyethylene homopolymers, polypropylene homopolymers, copolymers comprising ethylene, and copolymers comprising propylene. Polyethylenes (abbreviated PE) useful for the compositions described herein can be prepared by a variety of methods, for example but not limitation, the well-known Ziegler-Natta catalyst polymerization (see for example U.S. Pat. No. 4,076,698 and U.S. Pat. No. 3,645,992), metallocene catalyst polymerization (see for example U.S. Pat. No. 5,198,401 and U.S. Pat. No. 5,405,922), Versipol® catalyst polymerization and by free radical polymerization. The polymerization can be conducted as solution phase processes, gas phase processes, and the like. Polyethylene polymers useful herein can include linear polyethylenes such as high density polyethylene (HDPE), linear low density polyethylene (LLDPE), very low or ultralow density polyethylenes (VLDPE or ULDPE) and branched polyethylenes such as low density polyethylene (LDPE). The densities of polyethylenes suitable for use in the present invention range from about 0.865 g/cc to about 0.970 g/cc. Linear polyethylenes for use herein can incorporate alpha-olefin comonomers such as butene, hexene or octene to decrease their density within the density range so described. For example, the copolymer used in component (c) comprises a major portion (by weight) of ethylene that is preferably copolymerized with another alpha-olefin. The alpha olefin preferably contains 3 to about 20 carbon atoms and can represent up to about 20% by weight of the copolymer. Preferred alpha-olefins are propylene, 1-butene, 1-hexene, 4-methyl-1-pentene, 1-octene, 1-decene, 1-tetradecene, 1-octadecene, etc. and these alpha olefins may be used either singularly or in admixtures of two or more. Particularly preferred are propylene, 1-butene, 1-hexene, 1-octene and 4-methyl-1-pentene. Blends of two or more of these ethylene alpha-olefin copolymers can also be used in accordance with the present invention. The polyethylene copolymer may also be an ethylene propylene elastomer containing a small amount of unsaturated compounds having a double bond. Ethylene copolymers having small amounts of a diolefin component such as butadiene, norbornadiene, hexadiene and isoprene are also generally suitable, although less preferred. The term "polyethylene" when used herein is used generically to refer to any or all of the polymers comprising ethylene described above.

A polyethylene of note is a copolymer of ethylene and 1-butene. Such a copolymer with 12.6 weight % 1-butene, having a melt index of 3.5 is available as Exact® 3035 from Exxon Mobil.

Another polyethylene of note is a copolymer of ethylene and 1-octene. Such a copolymer with 12 weight % octene, having a melt index of 3.5 is available as Engage® 8450 from DuPont Dow Elastomers.

Polypropylene (abbreviated PP) polymers include homopolymers, random copolymers, block copolymers and terpolymers of propylene. Copolymers of propylene include copolymers of propylene with other olefins such as ethylene, 1-butene, 2-butene and the various pentene isomers, etc. and preferably copolymers of propylene with ethylene. Terpolymers of propylene include copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymer of propylene and ethylene. The term "polypropylene" when used herein is used generically to refer to any or all of the polymers comprising propylene described above.

Homopolymers and random copolymers can be manufactured by any known process. For example, polypropylene polymers can be prepared in the presence of catalyst systems of the type known as Ziegler-Natta, based on organometallic compounds and on solids containing titanium trichloride.

Block copolymers can be manufactured similarly, except that propylene is generally first polymerized by itself in a first stage and propylene and additional comonomers such as ethylene are then polymerized, in a second stage, in the presence of the polymer obtained during the first. Each of these stages can be carried out, for example, in suspension in a hydrocarbon diluent, in suspension in liquid propylene, or else in gaseous phase, continuously or noncontinuously, in the same reactor or in separate reactors.

Additional information relating to block copolymers and to their manufacture may be found particularly in chapters 4.4 and 4.7 of the work "Block Copolymers" edited by D.C. Allport and W. H. Janes, published by Applied Science Publishers Ltd in 1973, which are incorporated by reference in the present description.

The polyolefins suitable for use in this invention can also be modified by the incorporation of low levels (typically less than about 3 weight %) of polar monomers including, for example but not limitation vinyl acetate, alkyl acrylates, carbon monoxide, glycidyl methacrylate, (meth)acrylic acid and maleic anhydride. The incorporation of these polar comonomers can be accomplished by copolymerization or by grafting.

Optionally, all or part of polyolefin component (c) can be grafted with a mono- or multi-carboxylic acid moiety (or an anhydride derivative of a carboxylic acid moiety), by polymerizing a grafting monomer having vinyl or allylic functionality and the acid or anhydride moiety. Other grafting monomers, such as styrene and/or vinyl acetate can also be used in place of or in addition to the carboxylic grafting monomers.

Thus, a wide variety of olefinic polymers and copolymers can be used in accordance with the present invention.

Blends of two or more polyolefins can be used to provide the polyolefin component of this invention. For example, LLDPE can be blended with either LDPE or HDPE to provide polyethylene blends suitable for use in this invention. Another suitable polyolefin blend is a blend of polypropylene and poly(1-butene) (PB).

Fillers

The compositions of this invention may also optionally contain additional components including fillers. Addition of fillers can function as a way to increase the temperature resistance and affect peel seal characteristics of the composition.

A filler comprises particles of inorganic compounds, such as minerals and salts. The percentage of filler that can be included in the composition of the present invention on a weight basis is primarily a function of the density of the filler. Particle size and shape of the filler also will have an effect on properties of blends. Fine particle size fillers generally have a tendency to result in higher blend viscosities and they are also more expensive. No. 9 Whiting (about 95% through 325 mesh) represents a viable midpoint in coarseness, availability, and cost. More preferred fillers are calcium carbonate and talc (essentially $Mg_3Si_4O_{10}(OH)_3$), and most preferred is talc. The amount of filler present in the composition of the present invention is from about 0.1 to about 50 parts by weight.

It should be appreciated that various additives as generally practiced in the art can be present in the composition, provided their presence does not substantially alter the heat sealing properties of the composition. Thus, it is contemplated that various additives such as antioxidants and thermal stabilizers, ultraviolet (UV) light stabilizers, colorants, pigments and dyes, fillers, delustrants, anti-slip agents, plasticizers, anti-block agents, compatiblizers, components for modifying surface characteristics such as Coefficient of Friction (COF), anti static and anti fog agents, other processing aids and the like may be advantageously employed. These conventional ingredients may be present in the compositions used in this invention in quantities that are generally from 0.01 to 20 weight %, preferably from 0.1 to 15 weight %, so long as they do not detract from the adhesion functionality of the composition (the weight percentages of such additives are not included in the total parts by weight of the composition as defined above in the Summary of the Invention). Typically, many such additives may be present in from 0.01 to 5 weight %. Of note are antioxidants that may be present in from 0.01 to 1 weight %. Antioxidants are available under the trade name Irganox from Ciba Geigy Inc. Tarrytown, N.Y. For example, phenolic antioxidants such as Irganox E201, CAS Number 10191-41-0, or its derivatives may be added to the composition. Irganox 1010, CAS Number 6683-19-8, is another antioxidant suitable for use in this invention. Another antioxidant of note is Anox® 20, a hindered phenolic antioxidant with a non-organotin catalyst, available from Great Lakes Chemical Corporation. Also of note are additives for modifying surface characteristics such as coefficient of friction, for anti-blocking or for chill roll release that may be present in amounts from 0.01 to 5 weight %. For example, such an additive is a dispersion of silicon dioxide (2 weight %) in an ethylene/methacrylic acid copolymer used as carrier concentrate for blending into a resin (available from DuPont as Conpol® 20S2).

The optional incorporation of such conventional ingredients into the compositions can be carried out by any known process. This incorporation can be carried out, for example, by dry blending, by extruding a mixture of the various constituents, by the conventional masterbatch technique, or the like.

The adhesive resin composition of this invention may be produced by mixing predetermined amounts of the ethylene/vinyl acetate copolymer component (a), the tackifier (b), optionally the polyolefin (c) and optionally the filler (d) by a mixer such as a Henschel mixer, a V blender, a ribbon blender or a tumbler blender; or after mixing, melt-kneading the mixture by a single screw extruder, a twin screw extruder, a kneader, a Banbury mixer, etc. and then pelletizing, melt extruding, granulating or pulverizing the mixture.

Upon proper melt blending or heat mixing, the composition can be extruded through a die via coextrusion. The thickness of the extruded sealant is preferably about 1 to 400 microns, more preferably 5 to 100 microns, yet more preferably 10 to 30 microns.

Alternatively, the compositions of the present invention can be extruded into a film having a thickness of about 1 to 100 microns, more preferably 5 to 100 microns and yet more preferably 10 to 75 microns and subsequently laminated to paper, foil, or film as part of a multilayer structure.

The adhesive resin composition of this invention can be used to bond various substrates or polymers to each other. Typically, the articles are bonded or adhered by heat seal.

The final adhesive composition can be used directly, for example in a melt coextrusion, or it can be extruded in rope or pellet form or reduced to a chip or powder form for use in an appropriate applicator. It can be cast or extruded into a film or web form for subsequent use. In such shaped forms, it can be placed between the substances to be bonded and then activated by heat and pressure. It should be noted that the adhesives of this invention can be applied by any of the hot melt applicators commonly used by the practitioner.

Although these compositions can be applied in any thickness the practitioner finds expedient, it is preferred to employ layer thickness of from 0.0002 mils to 10 mils.

The present invention further provides a seal or laminate suitable for application to containers, packages, films and the like comprising PCTFE fluoropolymers by heat sealing, which has a good heat sealing property and can be easily peeled.

As noted above, films and coatings can be made from the compositions as described herein and laminated or coated onto other films or structures. Alternatively, the composition of the present invention can be simultaneously coextruded with other materials. To summarize, the adhesive resin compositions of the present invention have outstanding utility due to their unique chemical and physical properties as bonding agents and adhesives to provide so-called peel and seal adhesives and can be used in forms such as adhesive sheets, tapes, or laminated products.

As such, the present invention further is directed to a monolayer, or multilayer coextruded or laminated structure that involves the adhesive described herein as a layer, typically a heat seal layer, to bond to PCTFE fluoropolymers. The peel seal strength of these composition to PCTFE to allow for bonding of various lidding substrates, including substrates made from ethylene vinyl acetate, polyethylene, polystyrene, polypropylene, polyethylene terephthalate, polyvinyl chloride, metals such as aluminum, spun-bonded polyolefins such as TYVEK® (commercially available from E.I. du Pont de Nemours and Company), oriented polyesters such as MYLAR® (commercially available from E.I. du Pont de Nemours and Company), and the like, can be adjusted by varying the amount and type of ethylene/vinyl acetate copolymer, tackifier and/or polyolefin content in the adhesive composition.

As noted above, this invention provides a multilayer structure comprising at least one layer of the ethylene/vinyl acetate-tackifier composition described above and at least one additional layer comprising a material selected from the group consisting of foil, paper, polyesters, polyamides, polyolefins, polyethylene vinyl alcohol, polyethylene vinyl acetate, ethylene/(meth)acrylic acid copolymers and ionomers thereof, polyvinyl chloride, polyvinylidene chloride and anhydride-modified polyolefins for heat sealing to polychlorotrifluoroethylene fluoropolymers. Multilayer structures of note comprise at least one layer of the compositions of note as defined above. Preferred structures comprise at least one layer of the preferred compositions as defined above.

Typically the multilayer polymeric sheet will involve at least three categorical layers including, but not limited to, an outermost structural or abuse layer, an inner barrier layer, bulking layer and/or adhesive layer, and an innermost layer making contact with and compatible with the intended contents of the package and capable of forming the necessary seals (e.g. most preferably heat-sealable) to itself and the other parts of the package. Other layers may also be present to serve as adhesive or "tie" layers to help bond these layers together.

The outermost structural or abuse layer is typically oriented polyester or oriented or non-oriented polypropylene, but can also include oriented or non-oriented polyamide (nylon) or polyethylene such as high density polyethylene or paper or foil. This layer, when optically transparent, preferably is reverse printable and advantageously unaffected by the sealing temperatures used to make the package, since the package is sealed through the entire thickness of the multilayer structure. When the outer structural or abuse layer is not optically transparent, this layer can be surface printed and then optionally coated with a protective coating or lacquer. The thickness of this layer is typically selected to control the stiffness of the film, and may range from about 10 to about 100 µm, preferably from about 12 um to about 50 µm.

The inner layer can include one or more barrier layers, depending on which atmospheric conditions (oxygen, humidity, light, and the like) that potentially can affect the product inside the package. Barrier layers can be, for example, metallized polypropylene (PP) or polyethylene terephthalate (PET), polyethylene vinyl alcohol (EVOH), polyvinyl alcohol (PVOH), polyvinylidene chloride, polyolefins, aluminum foil, nylon, blends or composites of the same as well as related copolymers thereof. Barrier layer thickness will depend on factors such as the sensitivity of the product and the desired shelf life.

The inner layer can include one or more bulking layers. This layer is usually added to create a structure that has a final, predefined thickness by using a common polymer that is of low cost. Bulking layers can be, for example, polyolefins, polyolefin polar copolymers, polyester and or blends of various bulking layer components. A bulking layer is also suitable for incorporation of regrind and scrap generated in the manufacturing process. For example, scrap generated from material that, for one reason or another, is not suitable for sale, or material that is generated by trimming the edges off a semifinished roll, can be ground up and incorporated into the inner layer providing bulk at relatively low cost.

The inner layer can include one or more adhesive layers. This adhesive layer is usually designed to adhere the outer structural layer to the inner layer, the inner layer to the innermost layer or, in the case where the inner layer may only be acting as an adhesive, bonding the outer layer directly to the innermost layer.

The structure and barrier layers can be combined to comprise several layers of polymers that provide effective barriers to moisture and oxygen and bulk mechanical properties suitable for processing and/or packaging the product, such as clarity, toughness and puncture-resistance. In some applications, the functions of structure and barrier layers may be combined in a single layer of a suitable resin. For example, nylon or PET are suitable for both structure and barrier functions.

Polyamides (nylon) suitable for use herein include aliphatic polyamides, amorphous polyamides, or a mixture thereof. "Aliphatic polyamides" as the term is used herein can refer to aliphatic polyamides, aliphatic copolyamides, and blends or mixtures of these. Preferred aliphatic polyamides for use in the invention are polyamide 6, polyamide 6.66, blends and mixtures thereof. Polyamides 6.66 are commercially available under the tradenames "Ultramid® C4" and "Ultramid® C35" from BASF, or under the tradename "Ube®5033FXD27" from Ube Industries Ltd. Polyamide 6 is commercially available under the tradename Capron® from Honeywell International, for example.

The film may further comprise other polyamides such as those described in U.S. Pat. Nos. 5,408,000; 4,174,358; 3,393,210; 2,512,606; 2,312,966 and 2,241,322, which are incorporated herein by reference.

The film may also comprise partially aromatic polyamides. Some suitable partially aromatic copolyamides for use in the present invention are the amorphous nylon resins 6-1,6-T commercially available under the tradename Selar® PA from E.I. du Pont de Nemours and Company or commercially available under the tradename Grivory® G 21 from EMS-Chemie AG, for example.

Ionomeric resins ("ionomers") are copolymers of an olefin such as ethylene and an unsaturated carboxylic acid, such as acrylic acid or methacrylic acid and optionally softening monomers wherein at least one or more alkali metal, transition metal, or alkaline earth metal cations, such as sodium, potassium or zinc, are used to neutralize some portion of the acidic groups in the copolymer, resulting in a thermoplastic resin exhibiting enhanced properties. For example, "Ethylene/(meth)acrylic acid (abbreviated E/(M)AA)" means a copolymer of ethylene (abbreviated E)/acrylic acid (abbreviated AA) and/or ethylene/methacrylic acid (abbreviated MAA) which are at least partially neutralized by one or more alkali metal, transition metal, or alkaline earth metal cations to form an ionomer. Terpolymers can also be made from an olefin such as ethylene, an unsaturated carboxylic acid and other comonomers such as alkyl (meth)acrylates to provide "softer" resins that can be neutralized to form softer ionomers. Ionomers are known conventionally and their method of preparation is described in, for example, U.S. Pat. No. 3,344,014.

Anhydride or acid-modified ethylene and propylene homo- and co-polymers can be used as extrudable adhesive layers (also known as "tie" layers) to improve bonding of layers of polymers together when the polymers do not adhere well to each other, thus improving the layer-to-layer adhesion in a multilayer structure. The compositions of the tie layers will be determined according to the compositions of the adjoining layers that need to be bonded in a multilayer structure. One skilled in the polymer art can select the appropriate tie layer based on the other materials used in the structure. Various tie layer compositions are commercially available under the tradename Bynel® from E.I. du Pont de Nemours and Company, for example.

Polyethylene vinyl alcohol ("EVOH") having from about 20 to about 50 mole % ethylene can be suitable for use herein, Suitable polyethylene vinyl alcohol copolymers are commercially available under the tradename EVAL® from Kuraray or commercially available under the tradename Soarnol® from Nippon Goshei, for example.

Polyvinylidene chloride (PVDC) polymers and copolymers suitable for use herein as coatings or films can be obtained commercially from Dow Chemical under the tradename Saran®, for example.

The innermost layer is the sealant layer. The sealant layer of this invention is prepared from the ethylene/vinyl acetate compositions described above.

The manufacture of a film used in this invention from the compositions described above can be carried out according to any known methods. It is possible, for example, to manufacture a primary film by extruding the said compositions using so-called "blown film" or "flat die" methods. A blown film is prepared by extruding the polymeric composition through an annular die and expanding the resulting tubular film with an air current to provide a blown film. Cast flat films are prepared by extruding the composition through a flat die. The film leaving the die is cooled by at least one roll containing internally circulating fluid (a chill roll) or by a water bath to provide a cast film. The film can be sized by conventional techniques such as slitting to provide a packaging film.

A film useful in the present invention can be further oriented beyond the immediate quenching or casting of the film. The process comprises the steps of extruding a laminar flow of molten polymer, quenching the extrudate and orienting the quenched extrudate in at least one or more directions. "Quenched" as the term is used herein describes an extrudate that has been substantially cooled below its melting point in order to obtain a solid film material.

The film can be unoriented, oriented in a uniaxial direction (e.g. machine direction), or oriented in a biaxial direction (e.g. machine direction and transverse direction).

The film is preferably biaxially oriented by drawing in two mutually perpendicular directions in the plane of the film to achieve a satisfactory combination of mechanical and physical properties.

Orientation and stretching apparatus to uniaxially or biaxially stretch film are known in the art and may be adapted by those skilled in the art to produce films of the present invention. Examples of such apparatus and processes include, for example, those disclosed in U.S. Pat. Nos. 3,278,663; 3,337,665; 3,456,044; 4,590,106; 4,760,116; 4,769,421; 4,797,235 and 4,886,634.

A blown film useful in the present invention may be oriented using a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which will induce longitudinal orientation.

The processing to obtain an oriented blown film is known in the art as a double bubble technique, and can be carried out as described by Pahlke in U.S. Pat. No. 3,456,044. More particularly, a primary tube is melt extruded from an annular die. This extruded primary tube is cooled quickly to minimize crystallization. It is then heated to its orientation temperature (for example, by means of a water bath). In the orientation zone of the film fabrication unit a secondary tube is formed by inflation, thereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film can be reinflated and passed through an annealing step (thermofixation), during which step it is heated once more to adjust the shrink properties.

In one embodiment, the film is formed by an extrusion process that causes the polymer chains in the film to be generally aligned in the direction of extrusion. Linear polymers, after being highly oriented uniaxially possess considerable strength in the orientation direction, but less strength in the transverse direction. This alignment can add strength to the film in the direction of extrusion.

The films of this invention may be treated by means of corona discharge, ozone or other means standard in the industry, although treatment is not required for good adhesion.

The seal strength of the multilayer structure to the container is typically dependent on the thickness of the ethylene/vinyl acetate heat seal layer. The thickness of the heat seal layer is preferably between about 10 and 40 microns and most preferably between about 10 to 30 microns thick.

In use, the multilayer structure is pressed against a substrate surface material and heated, thereby bonding the multilayer structure to the PCTFE substrate.

Typically a PCTFE layer is adhered directly to a second layer of PVC or PET to create the structure from which the container is formed. The PVC or PET is used as the sealing surface as they have high affinity to many heat sealable materials. The second layer of PVC or PET also provides bulk to the structure, as they are far less expensive than the PCTFE. Both materials provide high clarity and formability. However, these materials have insufficient oxygen and moisture barrier properties when used as the seal surface. When the top barrier sealant web is heat sealed to the PVC or PET, the barrier properties of the PCTFE cannot be fully realized. Oxygen and moisture permeate through the PVC or PET between the heat-sealable lidding material and the PCTFE, leading to shortened shelf life.

This invention allows the PCTFE to become the innermost layer and sealing substrate for the heat sealable top web, allowing the final package to realize the full barrier properties of the PCTFE, leading to longer shelf life. Also, not as much thinning of the PCTFE occurs in the forming process by making the PCTFE the inside layer instead of the outside layer. This invention allows for a high barrier, peelable lidding that provides an easily opened, transparent package with improved shelf life.

The improved sealant materials of this invention are expected to be very useful to the pharmaceutical industry in blister packaging.

Thus, the present invention is useful, for example, in packages such as blister packages for medicaments and nonmedicaments that are user-friendly to patients and other users of the package. It provides an attractive and inexpensive package for the merchandising of pharmaceutical and other products that is constructed in a manner that facilitates mass production.

The packages of the invention may contain from one to a multiplicity of articles, such as food, medicaments in the form of capsules, tablets, medical instruments, syringes, lozenges, pills and/or the like, or nonmedicaments, such as poisons, catalysts, cleaning compositions, batteries, and other goods that need to be protected from oxygen and moisture.

Package forms other than blister packages are also contemplated herein. The multilayer structures as described herein are useful in a wide variety of packaging applications as packaging materials. They may also be used as industrial films such as masking films whereby a film is thermally laminated to a substrate, such as foil or polyester or acrylic, and peeled off when surface protection is no longer required.

The packaging materials may also be processed further by, for example but not limited to, printing, embossing, and/or coloring to provide a packaging material to provide information to the consumer about the product therein and/or to provide a pleasing appearance of the package.

Some examples of multilayer film structures of this invention are listed below in which the Sealant layer is prepared from a ethylene/vinyl acetate composition of this invention and wherein "adh" refers to an adhesive system as described above, "tie" refers to an extrudable adhesive or tie layer, and "Ink" refers to the printing described above.

Multilayer film structures of this invention include blown films having the structures indicated:
Polyamide (Nylon)/tie/EVOH/tie/Sealant; or
PP/tie/EVOH/tie/Sealant.

Multilayer film structures of this invention include adhesive laminated films having the structures indicated:
Ink/Foil/adh/PE/PE/Sealant; or
PET/Ink/adh/PE/tie/EVOH/tie/Sealant.

Multilayer film structures of this invention include extrusion-coated films having the structures indicated:
Ink/Foil/tie/Sealant;
PET/PVDC/Ink/tie/Sealant;
Ink/PET/tie/Sealant;
Ink/Paper/PE/Sealant, Multilayer film structures of this invention include extrusion-laminated films having the structures indicated:
PET/PVDC/Ink/tie/Sealant;
PET/adh/Sealant; or
PET/adh/Nylon/tie/Sealant.

The multilayer structures described above may be incorporated into packages, such as lidded containers, by standard methods well known in the art. The multilayer structures are particularly useful as lidding materials for containers comprising PCTFE fluoropolymers. Accordingly, this invention provides packages comprising the ethylene/vinyl acetate compositions and/or multilayer structures described above. Packages of note comprise the compositions of note as defined above. Preferred packages comprise the preferred compositions as defined above.

While the invention has been particularly shown and described with reference to the preferred embodiments thereof, it will be understood by those skilled in the art that various changes in form and details may be made without departing from the spirit and scope of the invention.

The following Examples are merely illustrative, and are not to be construed as limiting the scope of the invention described and/or claimed herein.

EXAMPLES

Compositions were prepared from the materials listed below using standard blending techniques to provide Examples 1 through 13, compositions useful in this invention, summarized in Table 1 below.

Materials Used
EVA-1: An ethylene/vinyl acetate (7 weight %) copolymer with MI of 7 available from DuPont.
EVA-2: An ethylene/vinyl acetate (17 weight %) copolymer with MI of 30 available from DuPont.
EVA-3: An ethylene/vinyl acetate (12 weight %) copolymer with MI of 8 available from DuPont.
EVA-4: An ethylene/vinyl acetate (10 weight %) copolymer with MI of 3 available from DuPont.
PE-1: A copolymer of ethylene and 1-butene with MI of 3.5 (available as Exact® 3035 from Exxon Mobil).
PE-2: A copolymer of ethylene and 1-octene (12 weight % octane) with Ml of 3.5 (available as Engage® 8450 from DuPont Dow Elastomers).
Tack-1: A tackifier resin derived from poly-limonene available as Piccolyte® C115 from Loos & Dilworth, Inc.
Tack-2: A tackifier resin available as Regalite R1125 from Eastman.
Antiox-1: Antioxidant Irganox® 1010.
Antiox-2: Antioxidant Anox® 20.

The compositions are summarized in Tables 1 through 3, with amounts listed as parts by weight. "- -" means a component is not present in the composition.

TABLE 1

| Example | EVA (weight %) | PE (weight %) | Tackifier (weight %) | Antioxidant/ (weight %) |
|---|---|---|---|---|
| 1 | EVA-1(40) | PE-1(40) | Tack-2(20) | — |
| 2 | EVA-1(40) | PE-2(40) | Tack-2(20) | — |
| 3 | EVA-1(52) + EVA-2(3) | PE-1(35) | Tack-1(10) | — |
| 4 | EVA-1(52) + EVA-2(3) | PE-2(35) | Tack-1(10) | — |
| 5 | EVA-1(49.95) + EVA-2(5) | PE-1(30) | Tack-1(15) | Antiox-1(0.05) |
| 6 | EVA-1(49.95) + EVA-2(5) | PE-2(30) | Tack-1(15) | Antiox-1(0.05) |
| 7 | EVA-3(54.95) | PE-1(30) | Tack-1(15) | Antiox-1(0.05) |
| 8 | EVA-3(54.95) | PE-2(30) | Tack-1(15) | Antiox-1(0.05) |
| 9 | EVA-1(39.95) | PE-2(35) | Tack-2(25) | Antiox-2(0.05) |
| 10 | EVA-1(49.95) + EVA-2(5) | PE-2(32.5) | Tack-1(12.5) | Antiox-2(0.05) |
| 11 | EVA-3(54.95) | PE-2(26.25) | Tack-1(18.75) | Antiox-2(0.05) |
| 12 | EVA-1(49.95) + EVA-2(5) | PE-2(26.25) | Tack-1(18.75) | Antiox-2(0.05) |
| 13 | EVA-3(24) + EVA-4(59.5) + EVA-2(4) | — | Tack-1(12.5) | — |

Table 2 summarizes some physical properties of the heat seal compositions described herein.

TABLE 2

| Composition | Melt Index | Melting point | Vicat softening point |
|---|---|---|---|
| Ex. 1 | 8 | 94 | 68 |
| Ex. 2 | 8 | 97 | 67.7 |

TABLE 2-continued

| Composition | Melt Index | Melting point | Vicat softening point |
|---|---|---|---|
| Ex. 3 | 6.9 | 95 | 72 |
| Ex. 4 | 6.0 | 95.5 | 70.7 |
| Ex. 5 | 8.6 | 93 | 66 |
| Ex. 6 | 9.7 | 94 | 67.5 |
| Ex. 7 | 8.6 | 93 | 66 |
| Ex. 8 | 10.3 | 91 | 65.9 |

Tests Employed in Examples

Melt Index (MI) was measured in accord with ASTM D-1238, condition E, at 190° C., using a 2160-gram weight, with values of MI reported in grams/10 minutes. Density was determined in accord with ASTM D-792. Melting point (m.p.) was determined by differential scanning calorimetry (DSC) in accord with ASTM D-3418. Vicat softening point was determined in accord with ASTM D-1525.

Peel Strength: Seal layers were sealed to substrates using standard sealing equipment and conditions to provide one-inch wide sealed strips. The layers were separated at the seal layer/substrate interface unless otherwise noted and pulled in a tensile tester at room temperature in a "T-peel" configuration at a separation speed of 12 inches/minute. The average force required to separate the layers divided by the width is reported as the peel strength (g/inch). Typically, three to five separate determinations were averaged together and reported in the Tables. See ASTM F904.

The mode of failure reported in Table 3 is characterized one or more of the following possible descriptors and where appropriate is preceded with the number of specimens involving such mode of failure:

"P"—peels cleanly away from the substrate
"FT"—film tear (shredding)
"FB"—film break
"CL"—coating lift
"ZP"—zipper peel
"T"—tack
"NT"—no tack
"D"—delamination Examples 14-16

Films comprising the compositions of Examples 1, 3, and 5 were prepared and heat-sealed to a film comprising PCTFE. The films had a structure comprising (from outer layer to seal layer) 2 mil foil/0.5 mil ethylene acid copolymer (8.7 weight % methacrylic acid, MI of 10) as a tie layer/1 mil test composition. The seals were prepared using a Sentinel sealer at 40 psi with a dwell time of one second to provide a one-inch seal width.

Table 3 provides peel data (average of 5 repetitions reported in grams per inch width) at room temperature and 50% relative humidity. Comparative Examples in Table 3 are foil lidding materials based on solvent coatings. Comparative Example C17 uses a solvent coating based on styrene butadiene and Comparative Example C18 uses a solvent coating based on amorphous polyester. Both materials are available from Hueck Folien of Germany. Comparative Example C19 is a foil film structure comprising a blend of 95 weight % of an ethylene/methyl acrylate copolymer (20 weight % methyl acrylate comonomer; MI of 8) and 5 weight % of a very highly neutralized zinc ionomer of an ethylene/methacrylic acid copolymer (MI of 0.7) as the seal layer.

TABLE 3

| Example | Composition of film | Temperature Average Seal Strength (g/inch) | | | | Failure Mode |
|---|---|---|---|---|---|---|
| | | 250° F. | 300° F. | 350° F. | 400° F. | |
| 14 | Ex. 1 | 888 | 991 | 1177 | 1271 | 25P |
| 15 | Ex. 3 | 733 | 869 | 895 | 980 | 25P |
| 16 | Ex. 5 | 1510 | 1808 | 1879 | 1590 | 25P |
| C17 | | 0 | 0 | 227 | 372 | 25P |
| C18 | | 1328 | 1669 | 1719 | 1781 | 23P, 2D |
| C19 | | 982 | 953 | 950 | 1051 | 25P |

Inspection of the data in Table 3 shows that Comparative Example C17 provides low strength peelable seals. Comparative Example C18 provides seals of adequate strength, but incidences of delamination indicate the potential for contamination of the product with packaging material. Examples 14 through 16 provide seals with good to excellent strength with consistently clean peel performance.

Examples 21-23

Films comprising the compositions of Examples 1, 3, and 5 were prepared according to the description for Examples 14-16 and heat-sealed to a film comprising PCTFE. The PCTFE film was previously thermoformed into blister pack blanks using a Medipak Model CP-2I packaging machine (upper and lower forming temperatures 115° C.). The example films were heat sealed to the PCTFE face of the formed film at various temperatures at a seal pressure of 2,500 psi and 25 containers per minute.

Table 4 provides peel data (average of 5 repetitions) at room temperature and 50% relative humidity. Comparative Example C20 uses a film comprising the blend used in Comparative Example C16. Although Table 3 indicates that C16 seals adequately to PCTFE using higher temperatures, it did not seal to the PCTFE film at these low sealing temperatures. The Example films of this invention heat-sealed and then peeled cleanly from the PCTFE film, even using low sealing temperatures.

TABLE 4

| | Comparative Example C20 | Ex. 21 | Ex. 22 | Ex. 23 |
|---|---|---|---|---|
| | Composition of heat seal layer | | | |
| Seal Temperature ° C. | C16 | Ex. 1 | Ex. 3 | Ex. 5 |
| | Average Seal Strength (Grams/0.75 inch)[1] | | | |
| 125 | 17.7 no seal | 844 | 524 | 164 |
| 150 | 17.7 | 903 | 638 | 332 |
| 175 | 17.7 | 1000 | 674 | 285 |
| 200 | 17.7 | 983 | 645 | 429 |

[1]nominal width of blister pack heat-seal

Having thus described and exemplified the invention with a certain degree of particularity, it should be appreciated that the following claims are not to be so limited but are to be afforded a scope commensurate with the wording of each element of the claim and equivalents thereof.

The invention claimed is:
1. A package comprising a multilayer structure having an easily peelable opening feature and a tight hermetic seal wherein the multilayer structure comprises at least one polychlorotrifluoroethylene fluoropolymer substrate layer, and wherein the multilayer structure is prepared by a method comprising the steps of:

A. providing a polychlorotrifluoroethylene fluoropolymer substrate layer;
B. providing a resin composition that, when tested substantially in accordance with ASTM F 904-98, peels cleanly away from a polychlorotrifluoroethylene fluoropolymer substrate layer, wherein said resin composition consists essentially of:
  (1) from about 10 to about 90 weight %, based on the total weight of said resin composition, of at least one ethylene/vinyl acetate copolymer having a melt flow rate of 0.1 to 40 g/10 minutes, measured in accordance with ASTM D 1238, Condition E, at 190° C., using a 2.16 kg weight;
  (2) from about 5 to about 35 weight %, based on the total weight of said resin composition, of at least one tackifying resin;
  (3) from about 5 to about 45 weight %, based on the total weight of said resin composition, of at least one polyolefin selected from the group consisting of ethylene polymers; and
  (4) from 0 to about 30 weight %, based on the total weight of said resin composition, of filler;
  wherein the resin composition has a viscosity at 190° C. of from about 6 g/10 minutes to about 10.3 g/10 minutes as determined according to ASTM D 1238, Condition E, at 190° C., using a 2.16 kg weight, thereby providing a composition having a viscosity sufficiently high to form a sheet or tape when extruded at a temperature of 190° C.;
C. selecting an additional material selected from the group consisting of polyesters, polyamides, polyolefins, polyethylene vinyl alcohols, polyethylene vinyl acetates, ethylene/acrylic acid copolymers and ionomers thereof, ethylene/methacrylic acid copolymers and ionomers thereof, polyvinyl chloride, polyvinylidene chloride, anhydride-modified polyolefins and mixtures thereof that has a viscosity sufficiently high to form a sheet or tape when extruded at a temperature of 190° C.;
D. forming a multilayer coextrudate having at least two layers via coextrusion through a single die in the form of a film, a sheet or a tape, wherein i) a first layer of said extrudate comprises said resin composition of step B, ii) a second layer of said extrudate comprises said additional material of step C, and iii) said first layer is an outer layer of said multilayer coextrudate;
E. contacting said multilayer coextrudate with said polychlorotrifluoroethylene fluoropolymer substrate layer such that said first layer comprising said resin composition of step B is in contact with and adjacent to said polychlorotrifluoroethylene fluoropolymer substrate layer; and
F. applying sufficient heat and pressure for sufficient time to heat-seal said multilayer coextrudate to said polychlorotrifluoroethylene fluoropolymer substrate layer;
thereby forming a multilayer structure characterized by a tight hermetic seal and easy peelability wherein the coextrudate peels cleanly away from the polychlorotrifluoroethylene substrate leaving the substrate intact.

2. A package of claim 1 that is a blister package.
3. A package of claim 1 wherein the multilayer coextrudate having at least two layers is in the form of a film.
4. A package of claim 1 wherein the at least one ethylene/vinyl acetate copolymer has a melt flow rate of 3 to 8 g/10 minutes, measured in accordance with ASTM D 1238, Condition E, at 190° C., using a 2.16 kg weight.
5. A package of claim 1 wherein the multilayer structure additionally comprises at least one barrier layer.
6. A package of claim 5 wherein the at least one barrier layer comprises a material selected from the group consisting of metallized polypropylenes, polyethylene terephthalates, ethylene vinyl alcohol polymers, polyvinyl alcohols, polyvinylidene chlorides, polyolefins, aluminum foil, polyamides and mixtures thereof.
7. A package of claim 1 wherein the multilayer structure additionally comprises at least one bulking layer.
8. A package of claim 7 wherein the at least one bulking layer comprises a polymer selected from the group consisting of polyolefins, polyolefin polar copolymers, polyesters and mixtures thereof.
9. A package of claim 1 wherein the multilayer coextrudate additionally comprises at least one tie layer.
10. A package of claim 1 wherein the resin composition of step B consists essentially of:
  (1) from about 35 to about 60 weight %, based on the total weight of said resin composition, of at least one ethylene/vinyl acetate copolymer having a melt flow rate of 0.1 to 40 g/10 minutes, measured in accordance with ASTM D 1238, Condition E, at 190° C., using a 2.16 kg weight;
  (2) from about 5 to about 25 weight %, based on the total weight of said resin composition, of at least one tackifying resin; and
  (3) from 25 to about 45 weight %, based on the total weight of said resin composition, of at least one polyolefin.
11. A package of claim 1 wherein component (1) of the resin composition is a mixture of two or more different ethylene/vinyl acetate copolymers, each of said ethylene/vinyl acetate copolymers having a melt flow rate of 0.1 to 40 g/10 minutes, measured in accordance with ASTM D1238, Condition E, at 190° C., using a 2.16 kg weight.
12. A package of claim 1 wherein the resin composition, when sealed at a temperature of between 250° F. to 400° F. to the polychlorotrifluoroethylene fluoropolymer substrate layer and tested substantially in accordance with ASTM F 904-98, peels cleanly away from the polychlorotrifluoroethylene fluoropolymer substrate layer and the average seal strength is between about 865 g/inch to about 1890 g/inch.
13. A package of claim 1 wherein the multilayer coextrudate is laminated to a layer made of a material selected from the group consisting of paper and foil.
14. A package of claim 1 wherein the polyolefin is an ethylene homopolymer.
15. A package of claim 1 wherein the polyolefin is a copolymer of ethylene and butene.
16. A package of claim 1 wherein the polyolefin is a copolymer of ethylene and octane.

* * * * *